UNITED STATES PATENT OFFICE.

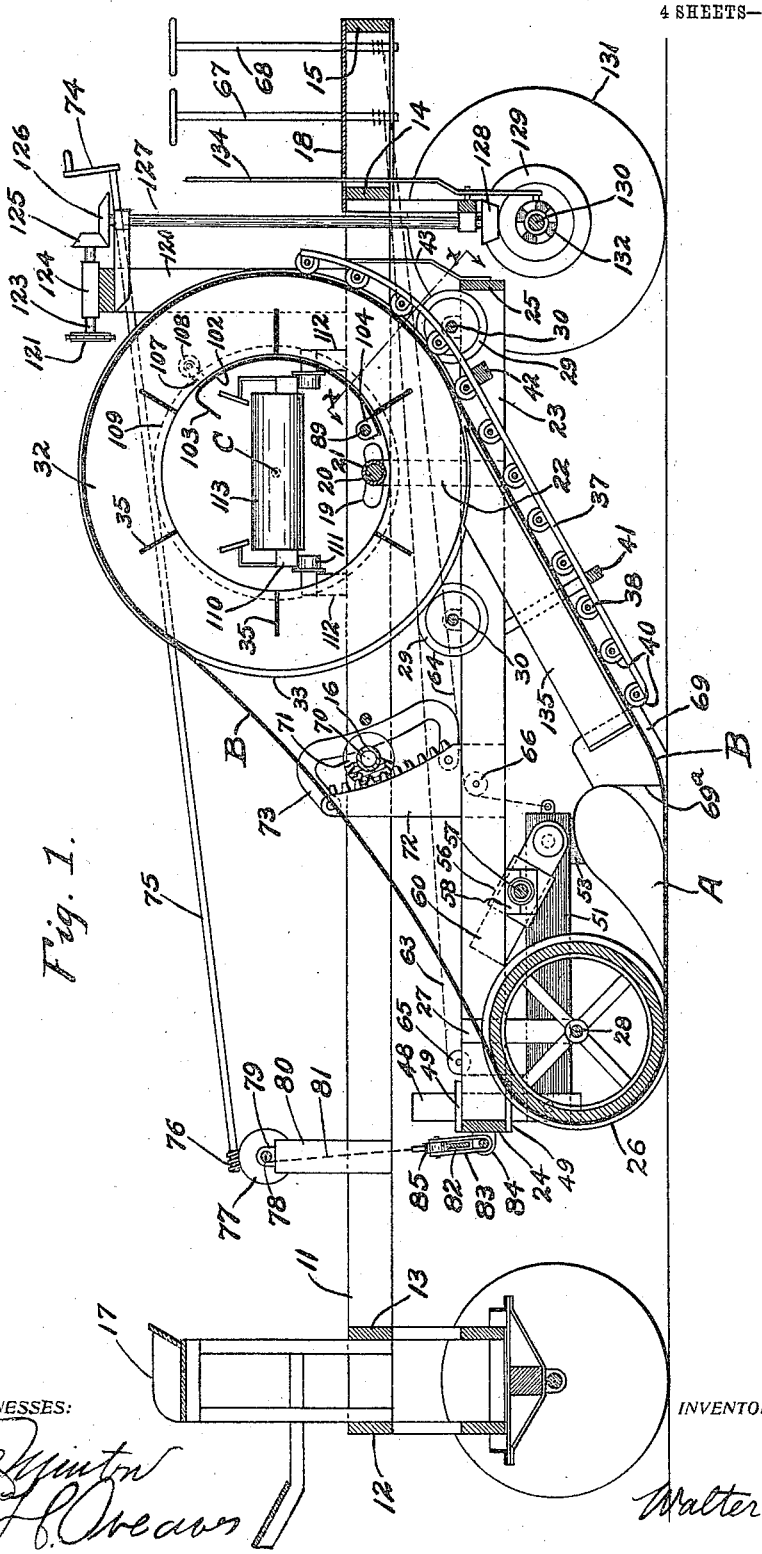

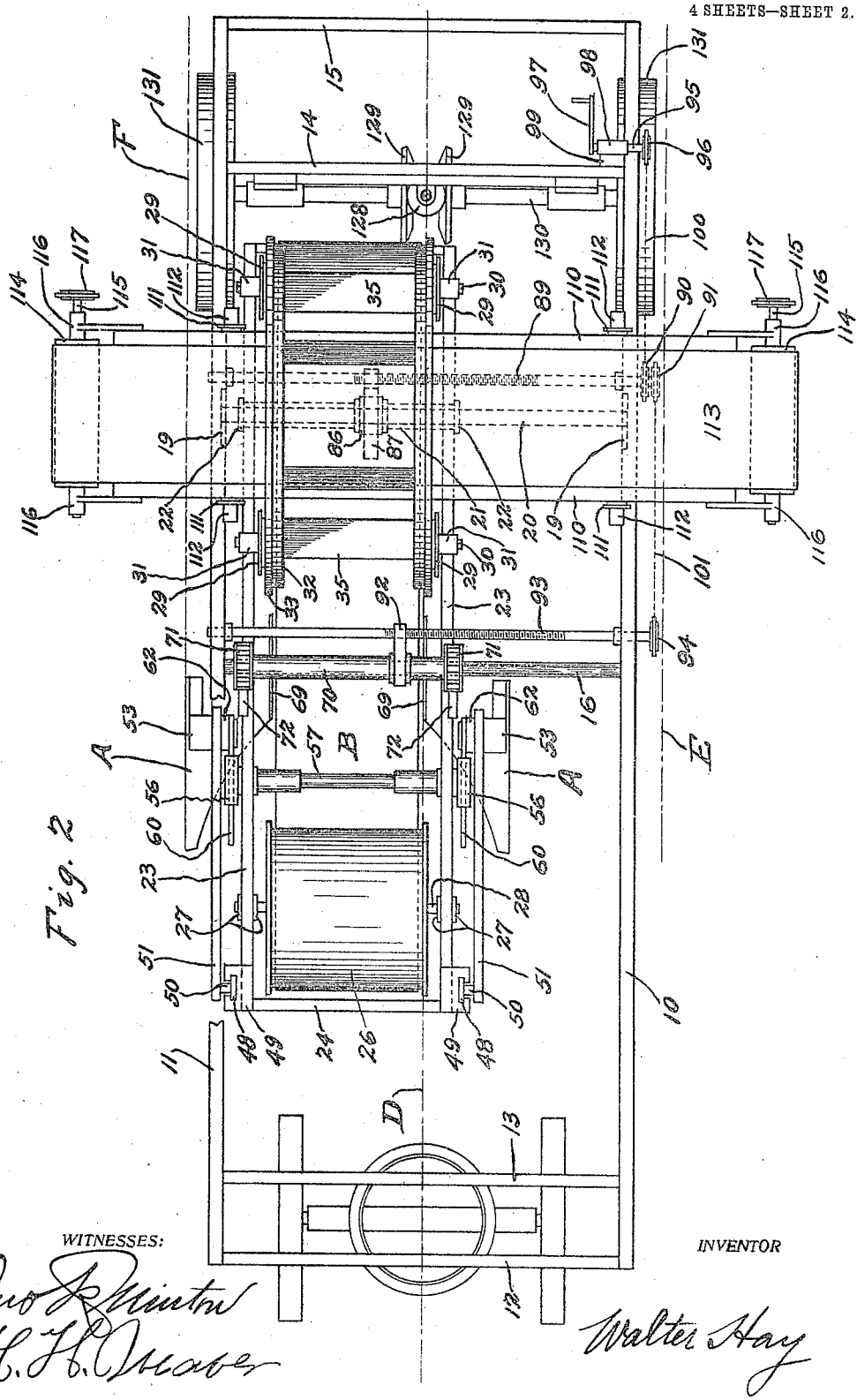

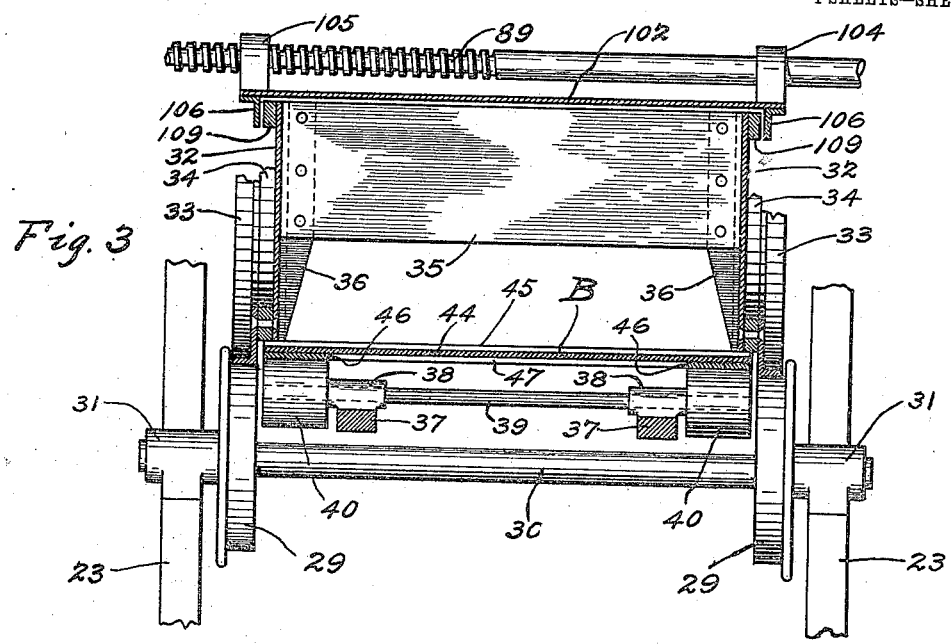
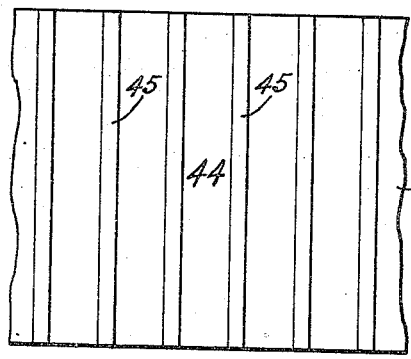
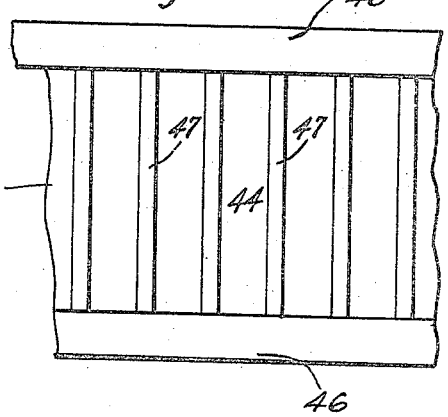
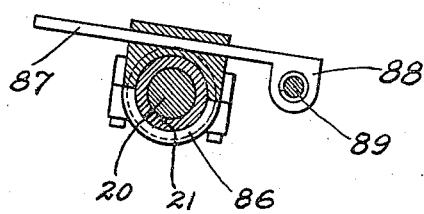

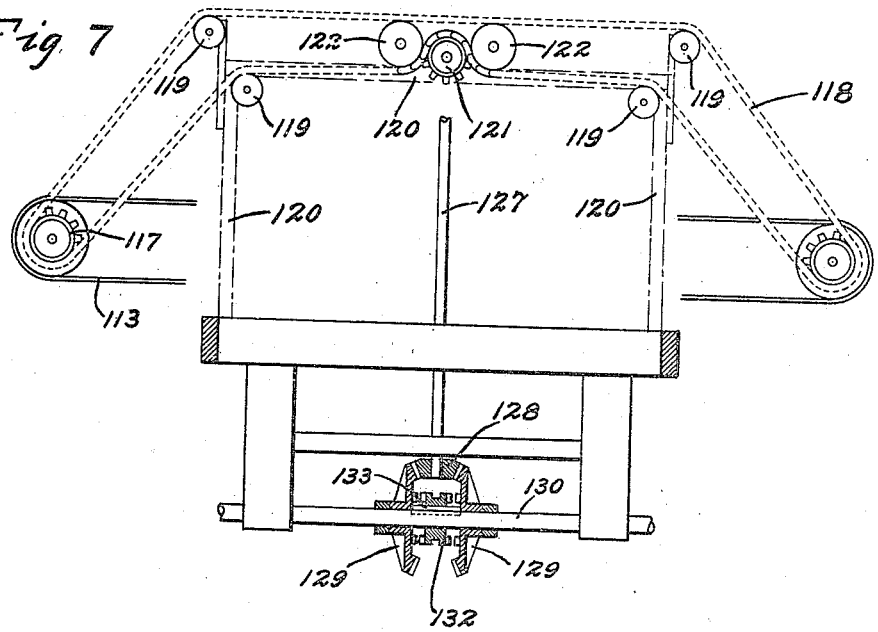
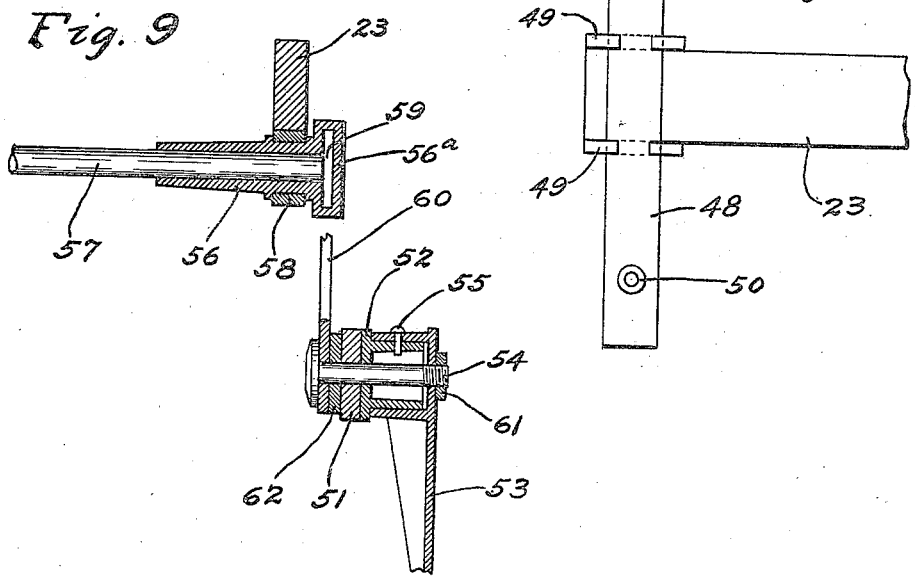

WALTER HAY, OF SEVILLE, OHIO, ASSIGNOR TO THOMAS F. STROUD, OF OMAHA, NEBRASKA.

GRADING AND DITCHING MACHINE.

948,816.  Specification of Letters Patent.  Patented Feb. 8, 1910.

Application filed December 5, 1908. Serial No. 466,162.

*To all whom it may concern:*

Be it known that I, WALTER HAY, a citizen of the United States, and resident of Seville, in the county of Medina and State of Ohio, have invented certain new and useful Improvements in Grading and Ditching Machines, of which the following is a specification.

My invention relates to that class of grading and ditching machines in which the soil is torn up by a plow and then carried by a longitudinally-disposed elevating conveyer to and delivered upon a transverse conveyer and then discharged therefrom at either side of the machine at the will of the operator. In machines of this character as heretofore constructed, it has been the practice to run the forward and lower end of the elevating conveyer-belt over a pulley or roller of small diameter carried close to the ground in order to better coöperate with the plow in the performance of their respective functions. It is my belief that this form of construction has a number of objectionable features, a few of which are here mentioned: The necessity of carrying the forward end of the belt close to the ground renders the belt and especially its supporting frame and the latter's supporting connections liable to serious injury in the event of an obstruction, such as a stump or stone, being encountered; it being almost impossible to prevent a portion of the soil from getting between the leaves of this belt, the inclined position of same causes such soil to collect at the lower end thereof where it frequently interferes with the proper running of the belt over the roller; and the running of this belt, which is necessarily strong and three or more ply in thickness and under considerable tension, over a roller of small diameter causes rapid wear of the texture of the belt and requires more power in its operation than were a larger roller or pulley adaptable.

A number of machines of the class above referred to have been designed to plow up the soil on either side of the machine, but not between the sides thereof; others have been designed to plow up the soil between the sides of the machine, but not outside the wheels thereof. It is obvious that with any grading and ditching machine not designed or adapted to plow up the soil at any point between the sides and between the wheels as well as outside the wheels thereof, it would be impossible to construct a ditch having width but little greater than that of the body of the machine including the wheels.

Objects of my invention are to provide a grading and ditching machine having provisions for plowing up the soil on either side thereof and outside of the outer lines of the wheels and also at any point between said lines, and for discharging the soil from either side of the machine, whereby the machine can be worked in either direction along one and the same side of the road or out upon which it is being operated, and whereby it is adapted to construct a ditch or the like in which the space between the sides need only be sufficient to receive the body of the machine and provide a few inches clearance for the free travel of the wheels; that is to say, if the body of the machine were seven-and-one-half feet wide, a ditch as narrow as eight feet can be constructed; to provide an elevating conveyer having at its forward end a belt pulley of such diameter as will enable it to safely roll over obstacles which would be apt to cause damage to the elevating conveyer of any machine of this character as heretofore constructed; to provide a grading and ditching machine in which the plows are carried by the same frame that supports the elevating conveyer, whereby the said plows and conveyer can be shifted laterally in either direction and raised and lowered as a unit; to minimize leakage of soil between the plows and elevating conveyer; to avoid breakage of parts and injury to the elevating conveyer when either of the plows encounters an obstruction; and to place all controlling devices within easy reach of one operator or attendant stationed at the most advantageous point.

Other meritorious features of the invention and details of construction will be fully understood from the following description in connection with the accompanying drawings, forming a part of this specification, in which—

Figure 1 is a vertical longitudinal sectional view of a grading and ditching machine embodying the principles of my invention. Fig. 2 is a top plan view of the same, with the upper portion of the elevating conveyer-belt removed for clearness of illustration. Fig. 3 is a section taken transversely through a portion of the elevator on the line $x$, $x$, Fig. 1. Fig. 4 is a plan of the inner side, and Fig. 5 a plan of the outer side of the elevating conveyer-belt, both views showing a portion only of the same. Fig. 6 is a detail referred to hereinafter. Fig. 7 shows the arrangement of the chain employed to drive the transverse conveyer. Figs. 8 and 9 are details relating to the plows.

As thus illustrated, my invention comprises a wheel-supported body-frame composed of two longitudinally-arranged side beams 10 and 11, joined by the transversely-arranged end beams 12 and 13, 14 and 15, and the round bar or fixed shaft 16 near the center. Said body-frame is provided at its forward end with a driver's seat 17, and at its rear end with a platform 18 for the operator. Formed in the said side beams, or preferably in plates secured thereto, are curved slots 19, the top and bottom of which describe arcs from the center C. Extending from side to side and supported by means of said grooves and adapted to roll therein, is a round bar or shaft 20, loosely mounted on which is a sleeve-like hanger 21, and fixed to each end thereof is a downwardly-extending arm 22.

Rigidly secured to the hanger-arms 22 is the elevator frame, which comprises two longitudinally-arranged side beams 23, joined by transversely-arranged end beams 24 and 25, and also by means of the aforesaid hanger. When in its working position, as shown in Fig. 1, the forward portion of the elevator frame is supported by means of the flanged belt-pulley or drum 26, the downwardly-extending arms, in pairs, 27, and the rotary axle or shaft 28 passed through and secured to the hubs of the said drum and extending through journal-boxes fast to the lower ends of the double arms 27, which latter, be it understood, are fixed at their upper ends to the side beams 23.

The four flanged-wheels 29 are secured in pairs to the shafts 30 which pass through journal-boxes 31 secured on the side beams 23. Mounted on the said flanged-wheels and adapted to rotate thereon is the elevator, which comprises a pair of annular disks 32 secured to which are the angle-bar tires 33 serving also as flanges to guide the elevating conveyer-belt B. Secured between the disks and tires are rings 34, Fig. 3, which, in coöperation with the disks, provide a sufficient bearing-surface for the peculiarly constructed belt B. Connecting the disks and firmly secured thereto are a number of rectangular plates or, as I prefer to call them, lifting blades 35 which may be secured to the disks in various ways, but preferably by means of angle-bars 36 having the outlying portion of the inwardly-projecting leg beveled as shown, the purpose of which will be explained hereinafter.

A supporting frame comprising parallel bars 37 is positioned beneath the inclined portion of the lower leaf of belt B, and the upper portion of said bars is concentric with the elevator disks. The journal-boxes 38, secured to the bars 37 of the said frame, support and permit rotation therein of the shafts 39 (Fig. 3) secured to the outer ends of which are idler-pulleys 40 which support the belt B, direct its course of travel coincident with the periphery of elevator and between the aforesaid tires 33, which also serve as flanges for the guidance of the belt as before stated. The parallel bars 37 are rigidly secured to the elevator frame by means of the suspended cross-bar 41 (Fig. 1), the bar 42 direct-connected to the elevator frame side beams, and a pair of stanchions 43 secured at their lower ends to the end beam 25.

The endless elevating conveyer-belt B, as at present constructed, comprises a flexible body 44 (Fig. 3) to which is secured on its inner side, a series of flat metallic bars 45 (Fig. 4) extending the full width of the belt, and on its outer side, the narrow reinforcing belts 46 (Fig. 5) and a series of flat metallic bars 47 extending across the space between the said reinforcing belts, the bars 47 and belts 46 being substantially of the same thickness. These reinforcing belts serve the double purpose of affording additional protection to the edges of the body 44, and an unbroken bearing-surface along the sides of the composite belt where supported by the idler-pulleys 40. The bars 47 are secured to that side of the belt-body which comes in contact with the ground, and serve the double purpose of prolonging the life of the composite belt and of preventing the same from slipping over the ground, the object of which will be made apparent hereinafter. The bars 45 on the inner side of the belt-body serve the treble purpose of supporting that portion of the said belt-body extending across the space between the elevator disks 32, of providing in effect, iron-clad edges for the belt-body to sustain the wear resulting from the contact of such edges with the flanges of the elevator and the drum 26 and certain guiding means interposed therebetween, and of aiding in the conveyance of the soil up the inclined portion of the said conveyer-belt.

Referring to the plows, the vertically-arranged rectangular bar 48 (see also Fig. 8), adapted to slide up and down in the brackets 49 secured to the elevator frame side beams 23, is provided near its lower extremity with a stud-bolt 50 which pivotally secures the said bar 48 to the plow-beam 51 to which is firmly secured at its rear end an outwardly-projecting hollow stubbed axle 52 (Fig. 9) closely fitted into, and permitting (under certain conditions) of rotation thereon, the socket-headed plow-standard 53 which is held against lateral displacement by the bolt 54 and prevented from freely rotating on the axle 52 by the pin 55 passed through the walls of both standard 53 and axle 52 and which is sufficiently strong to withstand all ordinary strains resulting from the action of the plow, but in the event of the plow encountering an impassable barrier, said pin will be sheared and the plow permitted to rotate on the axle and then drag over the ground until the machine is stopped, thus preventing damage to other parts of the machine. The socket 56, adapted to rotate or rock on the shaft 57 and in the journal-box 58 secured to the side beam 23, is formed with a slot 59 through which passes the guide-bar 60 which is provided at its rear end with an aperture through which is passed the bolt 54, the functions of which are to provide a pivotal connection between the said guide-bar 60 and plow-beam 51 and in effect to draw the two closely together to prevent lateral movements of the plow. The said bolt 54 is threaded on its outer end and is screwed into the plow-standard 53, drawing the same against the shoulder of the axle 52 which, as before stated, is firmly secured to the plow-beam 51 and virtually a part thereof. The bolt 54 is prevented from turning by a check-nut 61. It will be observed that the guide-bar 60 does not actually contact with the plow-beam 51, but is separated therefrom by the washer 62 which, being thicker than the wall 56$^a$ of the socket 56, permits the said plow-beam to pass by the said socket (see Fig. 2) when the former is raised and lowered.

The chains or ropes 63 and 64 are attached to the front and rear ends respectively of the plow-beam 51, and running over sheaves 65 and 66 are continued back and connected to the vertical winding-shafts 67 and 68 which, being provided with suitable hand-wheels or other turning means and the usual ratchet and pawl (not shown) and by means of the foregoing arrangement, control the elevation and angle of penetration of the plow.

The right and left hand plows A are suitably secured to the plow-standards 53 and, in the present construction, their mold-boards are provided with an extension 69, that portion of which forward of the line 69$^a$ (Fig. 1) forms practically a continuation of the moldboard and serves to force the soil over to and upon the belt B; that portion to the rear of line 69$^a$ is positioned close to and parallel with the belt B and serves to confine the soil to the belt at that point, and as an intermediate guide for the said belt.

Loosely mounted on the round bar or shaft 16 is a sleeve 70, firmly secured to both ends of which is a shrouded-pinion 71 in engagement with a gear-toothed standard 72 rigidly secured to the side beams 23 of the elevator frame. Secured to the standards 72 for the purpose of holding same in engagement with the pinions 71 is a curved guide-bar 73 (Fig. 1), the inner surface of which, in contact with the shaft 16, describes an arc from the center C and is concentric with the pitch line of gear-teeth on the standard.

The forward portion of the elevator frame and all devices connected therewith are raised and lowered by means of the crank 74 (Fig. 1) fast to the rod 75 keyed to the worm 76 meshing with worm-gear 77 keyed to the winding-shaft 78 extending transversely across the machine and through a journal-box 79 located at each side of the machine and supported by a standard 80 fast to each side beam of the body-frame; connected to the winding-shaft 78 and suspended therefrom at each side of the machine is a chain or rope 81; these two chains are attached at their lower extremities to the upturned ends of a flat bar 82 of such length that when raised it will pass between and be guided by the aforesaid standards; the U-shaped hanger 83, secured at its lower end to a pivot-pin passed loosely through an eye-bolt 84 at each side of the hanger and fast to the front end of elevator frame, is provided at its upper end with a fixed axle-pin passed through both sides of the hanger, and loosely mounted thereon is a roller 85 adapted to roll on the suspended bar 82.

The sleeve-like hanger 21 (Fig. 2) is constructed, at a point intermediate its ends, with a circumferential groove in which is loosely fitted a split collar 86, the upper part of which is constructed with a slot (Fig. 6) through which is passed a bar 87 formed at one end with a head 88 through which is a threaded aperture adapted to receive a rotary screw-rod 89 which extends across the machine parallel with the shaft 20 (Fig. 2) and is journaled in boxes secured to the side beams 10 and 11 of the body-frame; one end of the screw-rod 89 extends beyond the side of the body-frame and is provided with a pair of sprocket-wheels 90 and 91 which are fixed to said screw-rod.

The sleeve 70 is constructed, at a suitable point between the pinions, with a circumferential groove in which is loosely fitted a collar-arm 92, the collar end (groove-fitted end) of which is split for assembling (similar to collar 86) and the opposite end is provided with a threaded aperture adapted to receive a rotary screw-rod 93 which extends across the machine parallel with the round bar 16 and is journaled in the side beams of the body-frame and provided at one end with a fixed sprocket-wheel 94 positioned in line with the afore-mentioned sprocket-wheel 91.

The shaft 95, provided at its outer end with a fixed sprocket-wheel 96 and at its inner end with a fixed crank 97, is journaled in a box 98 supported at a convenient height above the operator's platform by a post 99 which is fast at its lower end to the body-frame; the sprocket-wheels 96 and 90 are connected by an endless chain or link-belt 100, and the sprocket-wheels 91 and 94 are similarly connected by a chain 101; hence it will be seen that the screw-rods 89 and 93 are in operative connection with the crank 97.

Extending through the central, circular opening of the elevator and concentric with and in close proximity to the annular disk 32 is a curved shield-plate 102 formed at its upper end with a downwardly-inclined lip 103 and supported at its lower end by the before-mentioned screw-rod 89 which is passed through apertured blocks 104 and 105 (Fig. 3) which are fast to the said shield-plate; the block 105 is threaded to fit the threaded portion of the said screw-rod, the purpose of which will be better understood later. The sides of the said shield-plate project for a short distance beyond or outside the disks 32 and are stiffened by angle-bars 106, which also serve to prevent leakage of soil between the shield-plate and the disks. Secured to the upper end of the shield-plate and at each side thereof is an upwardly- and rearwardly-projecting arm 107 (Fig. 1) provided at its upper end with a stud-axle on which is loosely mounted a small roller-wheel 108 adapted to roll on an annular bar 109 fast to the outside of each of the disks 32 and flush with the inner periphery thereof (also see Fig. 3), the purpose of such arrangement being to support the upper portion of the shield-plate against pressure of the soil and avoid excessive friction in so doing.

The transverse conveyer comprises a suitably constructed frame of which the side bars 110 (Fig. 2) are shown mounted on four flanged-rollers 111 arranged in pairs on each side of the machine and adapted to rotate on stud-axles projecting horizontally from the upper ends of the standards 112 secured to the body-frame; an endless conveyer-belt 113 is adapted to run over the end pulleys 114 secured to the shafts 115 which are journaled in boxes 116, secured to the side bars 110, and provided at one end with a fixed sprocket-wheel 117; it should be understood that both the upper and lower leaves of the conveyer-belt 113 are supported by the usual idler-rollers (not shown) located at suitable points between the end pulleys 114; and that suitable means are provided for moving the said conveyer endwise in either direction, and for locking the same in any desired position; and that when desired, the standards 112 can be constructed to slide vertically in brackets fixed to the body-frame, and arranged in connection with suitable raising and lowering means whereby the said conveyer is adapted to be adjusted vertically and, when so desired, to be tilted to make either of its ends the uppermost end. Said conveyer is driven by an endless chain or link-belt 118 (Fig. 7) which travels over idler-wheels 119 adapted to rotate on stud-axles secured to a frame 120 fixed to and rising above the body-frame; said chain 118 is driven by a sprocket-wheel 121 and held in engagement therewith by smooth-faced wheels 122 disposed on opposite sides of the sprocket-wheel as shown; said sprocket-wheel 121 is secured to the front end of a longitudinally-disposed shaft 123 (Fig. 1) which is journaled in a long box 124 fixed centrally on the elevated cross-piece of the frame 120; fixed to the rear end of the shaft 123 is a bevel pinion 125 meshing with a bevel gear 126 fixed to the upper end of a vertical shaft 127 which is supported near its ends by journal-boxes and provided at its lower end with a fixed bevel pinion 128 meshing with the bevel gears 129 (also see Fig. 7) loosely mounted on the rear axle 130 which is secured to the driving wheels 131 in any suitable manner, but preferably by means of the usual ratchet devices. A jaw-clutch 132 is adapted to slide on a feather-key 133, fixed to the rear axle 130, and engage either of the jaw-provided bevel gears 129 which are thus locked to the said rear axle. A hand lever 134 (Fig. 1), within easy reach of the operator, is employed to move the aforesaid jaw clutch from one bevel gear to the other, and so reverse the motion of the power transmitting devices thus arranged and cause the conveyer-belt 113 to travel in either direction, so as to discharge the soil from either side of the machine.

It will be understood that the machine is provided with suitable draft connections at its forward end, whereby it may be drawn either by animal or mechanical power; and that the drum 26 can be adjustably connected to the elevator frame, whereby the distance between the drum and the elevator may be varied to suit the practical requirements of the belt B, which is adapted to travel over both drum and elevator, as shown; and that the bars 37 can be provided at their forward ends, in front of the first pair of idler-pulleys, with a transversely-arranged scraper to dislodge any soil adhering to the bottom of the belt B. For simplicity and clearness of illustration, the foregoing and other features of arrangement and many details of construction are not shown.

In the practical operation of the machine, the forward portion of the elevator frame and its appurtenances are permitted to ride on the ground, through the medium of the drum 26 (see Fig. 1), and the chains 81 are then given sufficient slackness to allow free up-and-down movements of said drum, caused by natural unevenness of the ground traveled over. As the machine advances, the drum 26 is caused to roll on the lower leaf of the endless conveyer-belt B which, by virtue of its coherence to the ground (augmented by the bars 47 hereinbefore described) under the frame-weighted drum, is caused to travel over both the drum and the elevator which latter will obviously be rotated thereby. It will be understood that that portion of the lower leaf of the belt extending from the vertical center line of the drum rearwardly to that point where it begins to curve upwardly, will lie temporarily motionless on the ground, and hence be advantageously adapted to receive the soil from either of the plows adjacent thereto. It will be seen that as the machine advances, the portion of the lower leaf of the belt extending rearwardly of the plows will be "picked up" by the idler-pulleys 40 which are arranged to give to said belt the preferred inclination and the requisite support, which latter is provided over a distance extending well up on the rear end of the elevator to a point where the tension in the belt renders further support of the kind unnecessary.

By reason of the before-described arrangement employed to connect the elevator frame to the body-frame, it will be understood that the former and all parts carried thereby are adapted to move in a vertical plane as if said elevator frame were pivoted to the body-frame at the center C, which center is also the axis of rotation of the elevator. From this it will be seen that as the forward portion of the elevator frame rises and falls, the distance between the elevator and the drum 26, the tension in the belt B, and its position in relation to the elevator frame, and the position of the plows in relation to the said belt and drum will all remain unchanged. It will also be understood that through the instrumentality of the oppositely-disposed standards 72 enmeshed with the equalizing pinions 71, the forward portion of the elevator frame and its appurtenances will be adapted to rise and fall evenly—that is to say, the drum axle 28 will be maintained parallel with the round bar 16, and substantially so with the axis of rotation of the elevator, due to the said equalizing pinions not permitting the standards 72 and the side beams 23 affixed thereto to move upwardly or downwardly one ahead of the other. From this it is obvious that notwithstanding the unevenness of the ground traveled over and the downward pull of the working plow, the flanges of the drum 26 and those of the elevator will be maintained in alinement and thereby insure the proper travel of the conveyer-belt B.

During the advancement of the machine with the drum 26 and the conveyer-belt B lowered to their respective working positions, the plow selected for the work to be performed is lowered by means of its pair of winding-shafts 67 and 68 until the desired depth of cut is attained. It will be seen that when the plow is secured in such adjustment, the drum 26 will also serve the purpose of a caster-wheel for said plow and automatically govern its depth of cut relatively to the surface of the ground over which the machine is traveling. The plowed-up soil is deposited upon the lower leaf of the belt B and is confined thereto during its conveyance to the elevator by the mold-board extension 69 and the side plates 135, which latter are suitably secured, one at each side of the belt, to the elevator frame. The front ends of said side plates are adapted to bear lightly against the mold-board extensions, and are formed with a beveled edge to facilitate the passage of the soil; the rear ends are concaved concentric with the periphery of the elevator disks 32 and positioned in close proximity thereto and in line therewith. The soil as delivered from the plow in a continuous body or mass upon reaching the elevator, is confined between its disks 32 and aided in its elevation by the before-described lifting blades 35 and the angle-bars 36, which latter have their inwardly-projecting leg beveled to more easily penetrate the soil. It will be seen that were the said lifting blades not provided, the soil when at a certain elevation would have the tendency to gravitate and roll downward upon the advancing body of such soil. But, with the present and preferred construction the soil is elevated positively, and when at a certain height it will fall against the shield-plate 102 and be forced by the lifting blades upwardly and over the top of said shield-plate from which point it will fall upon the transversely-arranged conveyer-belt 113 and be discharged therefrom at either side of the machine.

The fixed round bar or shaft 16 is adapted to sustain the longitudinal thrust of the elevator frame arising from the operation of the plows and the conveyer-belt B, such thrust being transmitted to the bar 16 through the medium of the standards 72 and the equalizing pinions 71, the latter sustaining the pressure of the former. The lateral thrust transmitted to the forward portion of the elevator frame by the action of one or the other of the plows is sustained by the screw-rod 93 (Fig. 2) which is secured against endwise movement by set-collars positioned in contact with the side beams of the body-frame; the arrangement adapting said screw-rod for the purpose just mentioned comprises the aforesaid standards 72, the teeth of which are fitted between the shrouds of the pinions 71, and the sleeve 70 which is fixed to the pinions and locked to the threaded portion of said screw-rod by means of the hereinbefore-described collar-arm 92.

Any lateral thrust transmitted to the rear portion of the elevator frame is similarly sustained by the screw-rod 89 through the hereinbefore-described arrangement whereby the sleeve-like hanger 21, fixed to said elevator frame, is locked to the threaded portion of the said screw-rod by means of the bar 87, which latter is adapted to slide in the before-described collar 86 in order to permit the supporting shaft 20 to move farther from or nearer to the said screw-rod as the forward portion of the elevator frame is raised or lowered.

From the foregoing and with the understanding that the pitch of the threads of both screw-rods are the same, and that the chain-connected sprocket-wheels fixed thereto are duplicates, it will be seen that the elevator frame can readily be adjusted with its side beams parallel with the side beams of the body-frame and that thereafter such adjustment will be maintained. It will also be seen that when the forward portion of the elevator frame is raised so that the drum 26 and the conveyer-belt B will clear the ground, the operator by turning the crank 97 is enabled to shift said elevator frame and all parts carried thereby to either side of the machine, and to any point or position between such sides, as may be desired. The rear portion of the elevator frame, through its hanger 21, is adapted to slide on the supporting shaft 20, while the front end is adapted to ride on the suspended bar 82 through the medium of the roller-wheel 85 and its associated supporting arrangement. It will be understood that by means of the internally-threaded block 105 (Fig. 3) which is fast to the curved shield-plate 102 and fitted to the threaded portion of the screw-rod 89, the said shield-plate will be shifted along with the elevator frame, and its position relatively to the elevator will remain unchanged.

From the foregoing detailed description of the construction and relative arrangement of the parts embraced in the present and preferred embodiment of my invention, it will be seen that I provide a novel and practical grading and ditching machine adapted for operation in either direction of its travel and along either side of a road or cut upon which it is being operated; and that the machine is adapted to plow up the soil on either side thereof and outside of the outer lines of the wheels as well as at any point between the outermost furrows; and also that the soil can be discharged from either side of the machine at the will of the operator.

With reference to its operation in constructing a ditch having width but little greater than that of the body of the machine, it will be seen by referring to Fig. 2 that one of the plows is positioned to remove that portion of the soil lying along the dotted center line D, which may be considered to represent the longitudinal center line of the ditch, while the other plow is positioned to cut outside of the wheels and remove that portion of the soil lying along the dotted line F, which may be considered to represent the far side of the ditch, and that by means of the shifting mechanism hereinbefore described, the plow firstly mentioned is adapted (by successive shifts) to remove that portion of the soil lying between the lines D and E (which latter line may be considered to represent the near side of the ditch) similarly as its companion plow may be imagined to have removed the soil lying between the lines D and F; in this way the soil would be removed at all points between the lines E and F were the machine to be operated in the one direction only, it being apparent that when the machine is operated in both directions the shifting of the plows would vary somewhat and that the same result would be accomplished in considerably less time.

It will readily be seen from the drawings that the elevating conveyer is provided at its forward end with a belt-pulley or drum sufficiently large to safely roll over and crush lumps of soil and thus act as a land roller to prepare a smooth path for the elevating conveyer-belt; and that by virtue of the arrangement associating the plows with the same frame that carries the elevating conveyer-belt, the plows are adapted to properly coöperate with said belt in the performance of their respective functions through the simple lowering of one or the other to its working position beside the belt; it being understood from this, that in general practice, when one plow is working, the other is raised clear of the ground; and that no lateral adjustment of the plows and the belt relatively to each other is necessary; and also that when the forward portion of the elevator frame is to be raised for any purpose—for instance, to permit turning of the machine—the plows will be raised simultaneously therewith by the turning of a single crank.

Instead of using plows as illustrated and described, any other equivalent device or implement may be employed.

Without limiting myself to the construction shown and described, I claim as my invention:—

1. A machine of the class described comprising in combination with an endless conveyer-belt, a plow or implement adapted to penetrate and loosen the soil and to deliver same upon the lower leaf of said conveyer-belt.

2. A machine of the class described comprising in combination with an endless conveyer-belt, a plurality of plows or implements adapted to penetrate and loosen the soil and to deliver same upon the lower leaf of said conveyer-belt.

3. A machine of the class described comprising in combination with a longitudinally-disposed endless conveyer-belt, means for penetrating and loosening the soil and delivering same upon the lower leaf of said conveyer-belt, a transversely-arranged conveyer passed between the leaves of and adapted to receive the soil from said conveyer-belt, means for imparting motion to said conveyer-belt, and means for imparting motion in either direction to said conveyer to effect a discharge of the soil from either end thereof.

4. A machine of the class described comprising in combination with a wheel-supported body-frame, an endless conveyer-belt disposed longitudinally between the sides of said body-frame and adapted to derive motion from its contact with the ground during the progression of the machine, means for penetrating and loosening the soil and delivering same upon the lower leaf of said conveyer-belt, and suitable instrumentalities for receiving the soil from said conveyer-belt and discharging the same from either side of the machine.

5. A machine of the class described comprising in combination with a wheel-supported body-frame, a belt-pulley or drum vertically-adjustable relatively to said body-frame and adapted to be rotated by contact or engagement of its flanges or outlying portions with the ground during the progression of the machine, an endless conveyer-belt adapted to travel over and derive motion from said belt-pulley or drum, means for penetrating and loosening the soil and delivering same upon the lower leaf of said conveyer-belt, suitable instrumentalities for receiving the soil from said conveyer-belt and discharging the same from either side of the machine, and means for putting said belt-pulley or drum into or out of contact with the ground.

6. A machine of the class described comprising in combination with a wheel-supported body-frame, a vertically-movable supplemental frame arranged between the sides of and in operative connection with the body-frame, an endless conveyer-belt carried by the supplemental frame, a vertically-movable plow or implement arranged at one side of the conveyer-belt and adapted to penetrate and loosen the soil and to deliver same upon the lower leaf of the conveyer-belt, suitable instrumentalities for receiving the soil from the conveyer-belt and discharging the same from either side of the machine, means for imparting motion to the conveyer-belt, means for raising and lowering said plow or implement relatively to the supplemental frame, and means for raising and lowering said supplemental frame.

7. A machine of the class described comprising in combination with a wheel-supported body-frame, an endless conveyer-belt disposed longitudinally between the sides of the body-frame, a vertically-movable plow or implement arranged at each side of the conveyer-belt, said plows or implements being adapted to penetrate and loosen the soil and to deliver same upon the lower leaf of the conveyer-belt, suitable instrumentalities for receiving the soil from the conveyer-belt and discharging the same from either side of the machine, means for imparting motion to the conveyer-belt, means for raising and lowering the plows or implements independently of each other and of the conveyer-belt, and means for raising and lowering the conveyer-belt.

8. A machine of the class described comprising in combination with a wheel-supported body-frame, a supplemental frame disposed longitudinally between the sides of and arranged to swing vertically on the body-frame, an endless conveyer-belt carried by the supplemental frame and caused to travel or work during the progression of the machine by being brought into contact or engagement with the ground, a vertically-movable plow or implement adjacent each side of the conveyer-belt and adapted to penetrate and loosen the soil and to deliver same upon the lower leaf of said conveyer-belt, devices serving as mediums of connection between the plows or implements and the supplemental frame, a transversely-arranged conveyer passed between the leaves of the conveyer-belt and adapted to receive the soil from said conveyer-belt and to discharge the same from either side of the machine, means for raising and lowering the plows or implements independently of each other and of the conveyer-belt, and means for lowering and raising the supplemental frame and hence putting said conveyer-belt into and out of contact or engagement with the ground.

9. A machine of the class described comprising in combination with a wheel-supported body-frame, means for penetrating and loosening the soil along a line outside the wheels at either side of the machine as well as any where between such line and a corresponding line at the opposite side of the machine, means for receiving and elevating the loosened soil, and means for discharging such soil from either side of the machine.

10. A machine of the class described comprising in combination with a suitable body-frame, a laterally-adjustable endless conveyer-belt, means for penetrating and loosening the soil and delivering same upon the lower leaf of the conveyer-belt, means for driving the conveyer-belt, and means for shifting said conveyer-belt laterally in either direction relatively to said body-frame.

11. A machine of the class described comprising in combination with a suitable body-frame, a vertically- and laterally-adjustable endless conveyer-belt, means for penetrating and loosening the soil and delivering same upon the lower leaf of the conveyer-belt, means for driving the conveyer-belt, means for raising and lowering the conveyer-belt relatively to the body-frame, and means for shifting said conveyer-belt laterally in either direction relatively to said body-frame.

12. A machine of the class described comprising in combination with a suitable body-frame, a vertically-adjustable drum or belt-pulley adapted to be rotated during the progression of the machine by contact or engagement of its flanges or outlying portions with the ground, an endless conveyer-belt adapted to travel over said drum, to contact with the ground and to be driven during the progression of the machine by its contact with both the ground and said drum, means for plowing up or loosening the soil and delivering same upon the lower leaf of said conveyer-belt, and means for lowering and raising said drum and conveyer-belt into and out of contact with the ground.

13. A machine of the class described comprising in combination with a wheel-supported main frame, means for plowing up or loosening the soil any where between a line outside the wheels at one side of the machine and a line half-way or about half-way between the sides of the machine, and suitable instrumentalities for receiving and elevating the plowed-up soil and discharging the same from either side of the machine.

14. A machine of the class described comprising in combination with a wheeled body-frame, a pair of plows or implements having a fixed distance apart and adapted to be moved laterally relatively to the body-frame, a soil-conveyer interposed between the plows and adapted to be moved laterally therewith and to receive the soil from either of said plows or from both at the same time, and means for putting either or both of said plows out of action.

15. A machine of the class described comprising in combination with a main frame, a soil-conveyer frame disposed longitudinally between the sides of and arranged to swing vertically on the main frame, a plurality of pinions fixed relatively to each other and connected to one of said frames, and a plurality of toothed standards or racks enmeshed with said pinions and connected to the other of said frames, for the purpose described.

16. In a machine of the class described, the combination of a frame, means associated with said frame for attaching and guiding a vertically-adjustable plow or equivalent implement, and comprising a bar (48) connected to said frame and arranged for up-and-down adjustment, a plow-beam (51) pivotally-connected at its forward end to said bar, a guide-bar (60) pivotally-connected to the rear portion of the plow-beam, and a journaled socket or socket-piece (56) carried by said frame and formed with a slot through which the said guide-bar is adapted to slide.

17. In a machine of the class described, the combination of a frame, a plow or equivalent implement, devices serving as mediums of connection between said frame and the plow, and comprising a suitable plow-beam, a bearing-piece or stubbed axle (52) fast to said plow-beam, a plow-standard (53) formed with a socket at its upper end and loosely mounted on said bearing-piece, and a pin (55) locking said plow-standard to said bearing-piece, but adapted to be sheared when the plow encounters an impassable barrier.

18. In a machine of the class described, an endless conveyer-belt, a rotary elevator coöperating with said conveyer-belt to elevate the soil, said elevator comprising a pair of oppositely-disposed annular flanged disks (32), a plurality of blades or plates (35) interposed between and fastened to said disks, and suitable means adjacent the inner periphery of said annular disks for confining the soil to its proper channel within the elevator until the preferred point of discharge therefrom is reached.

19. In a machine of the class described, a soil-conveying belt adapted to travel over the before-described elevator, and comprising a pliable body (44), a plurality of transversely-arranged bars (45) extending the full width and fast to one side of said body, while fast to the reverse side of said body and disposed along its longitudinal edges are a pair of belts (46) and a plurality of transversely-arranged bars (47) extending across the space between said pair of belts.

20. In a machine of the class described, a main frame, a laterally-movable supplemental frame disposed longitudinally between the sides of the main frame, a soil-conveying belt carried by said supplemental frame, a plurality of rotary screw-rods extending from side to side of and carried by the main frame, and means connected to said supplemental frame and in engagement with said screw-rods whereby said supplemental frame is shifted laterally as the said screw-rods are rotated.

21. A machine of the class described comprising in combination with a wheel-supported main frame, a supplemental frame disposed longitudinally between the sides of and arranged to swing vertically on the main frame, a belt-pulley or drum carried by the supplemental frame at its forward end, a rotary elevator carried by the supplemental frame near its rear end, an endless soil-conveying belt adapted to travel over both drum and elevator, means for vertically swinging the supplemental frame, and means for maintaining said drum and elevator the same distance apart as the said supplemental frame is swung into its various positions.

22. In a machine of the class described, a wheel-supported main frame, a vertically- and laterally-movable supplemental frame disposed longitudinally between the sides of and connected to the main frame, a belt-pulley or drum carried by the forward portion of the supplemental frame, a rotary annular elevator mounted on a plurality of wheels carried by the rear portion of the supplemental frame, an endless conveyer-belt arranged to travel over said drum and elevator and adapted through the coöperation of said drum to be driven during the progression of the machine by the contact or engagement of either or both conveyer-belt and drum with the ground, said conveyer-belt also being adapted to cause rotation of said elevator and to coöperate therewith in the elevation of the soil, means connected to the supplemental frame for penetrating and loosening the soil and delivering same upon the lower leaf of said conveyer-belt, a transversely-arranged conveyer passed through said elevator and adapted to receive the soil therefrom and to discharge the same from either side of the machine, means for putting said conveyer-belt into and out of engagement with the ground, and means for shifting as a unit the soil-loosening means and said conveyer-belt laterally relatively to the main frame to effect a removal of the soil any where between two lines disposed one at each side of the machine outside and beyond the wheels thereof, substantially as and for the purpose set forth.

In testimony whereof I have signed this specification in the presence of two subscribing witnesses.

WALTER HAY.

Witnesses:
Jo. K. Minton,
Howard H. Weaver.